(12) United States Patent
Ranganathan et al.

(10) Patent No.: US 8,627,143 B2
(45) Date of Patent: Jan. 7, 2014

(54) DYNAMICALLY MODELING AND SELECTING A CHECKPOINT SCHEME BASED UPON AN APPLICATION WORKLOAD

(75) Inventors: Parthasarathy Ranganathan, San Jose, CA (US); Bruce J. Walker, Rolling Hills Estates, CA (US); John L. Byrne, Pasadena, CA (US); Laura L. Ramirez, Los Angeles, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 351 days.

(21) Appl. No.: 12/834,603

(22) Filed: Jul. 12, 2010

(65) Prior Publication Data

US 2012/0011401 A1 Jan. 12, 2012

(51) Int. Cl.
*G06F 11/00* (2006.01)

(52) U.S. Cl.
USPC .......................................................... 714/19

(58) Field of Classification Search
USPC .......................................................... 714/19
See application file for complete search history.

(56) References Cited

U.S. PATENT DOCUMENTS

| | | | | |
|---|---|---|---|---|
| 6,161,219 A * | 12/2000 | Ramkumar et al. | .......... | 717/130 |
| 7,996,717 B1 * | 8/2011 | Colgrove et al. | ................ | 714/19 |
| 8,145,947 B1 * | 3/2012 | Hayden et al. | ................... | 714/20 |
| 2006/0053088 A1 * | 3/2006 | Ali et al. | ............................ | 707/1 |
| 2007/0168698 A1 * | 7/2007 | Coulson et al. | .................... | 714/5 |
| 2007/0283325 A1 * | 12/2007 | Kumar et al. | .................. | 717/122 |
| 2008/0120620 A1 * | 5/2008 | Lett et al. | ........................ | 718/103 |
| 2010/0031084 A1 * | 2/2010 | Tremblay et al. | ................ | 714/13 |
| 2010/0122052 A1 * | 5/2010 | Waldspurger et al. | ......... | 711/162 |
| 2011/0029490 A1 * | 2/2011 | Agarwal et al. | ................ | 707/684 |

* cited by examiner

*Primary Examiner* — Scott T Baderman
*Assistant Examiner* — Yair Leibovich

(57) ABSTRACT

Illustrated is a system and method for executing a checkpoint scheme as part of processing a workload using an application. The system and method also includes identifying a checkpoint event that requires an additional checkpoint scheme. The system and method includes retrieving checkpoint data associated with the checkpoint event. It also includes building a checkpoint model based upon the checkpoint data. The system and method further includes identifying the additional checkpoint scheme, based upon the checkpoint model, the additional checkpoint scheme to be executed as part of the processing of the workload using the application.

20 Claims, 10 Drawing Sheets

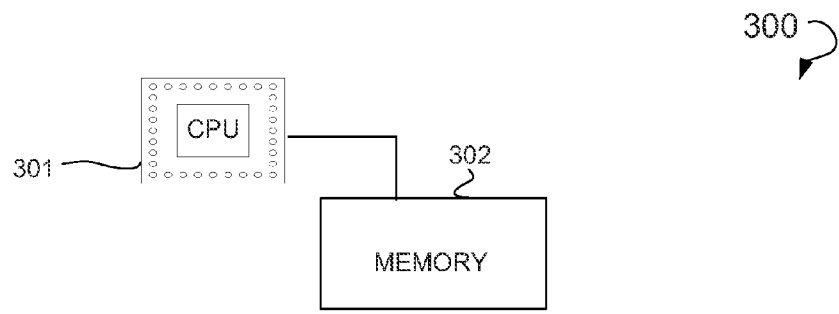
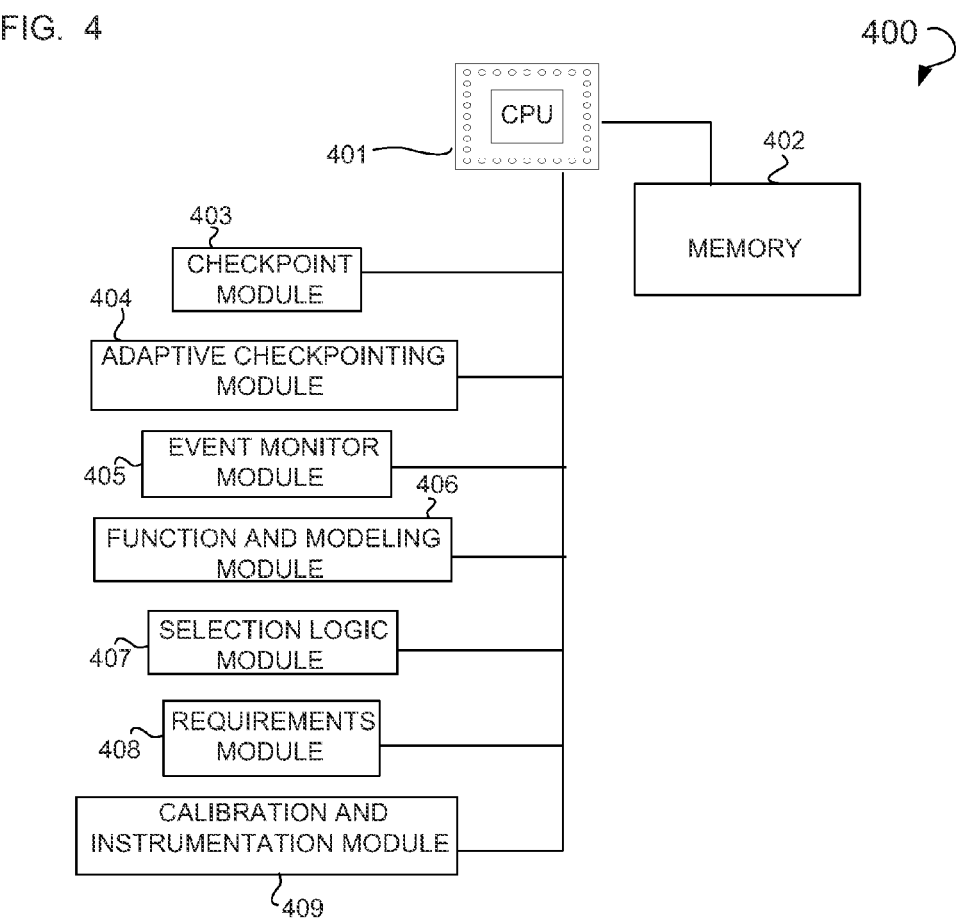

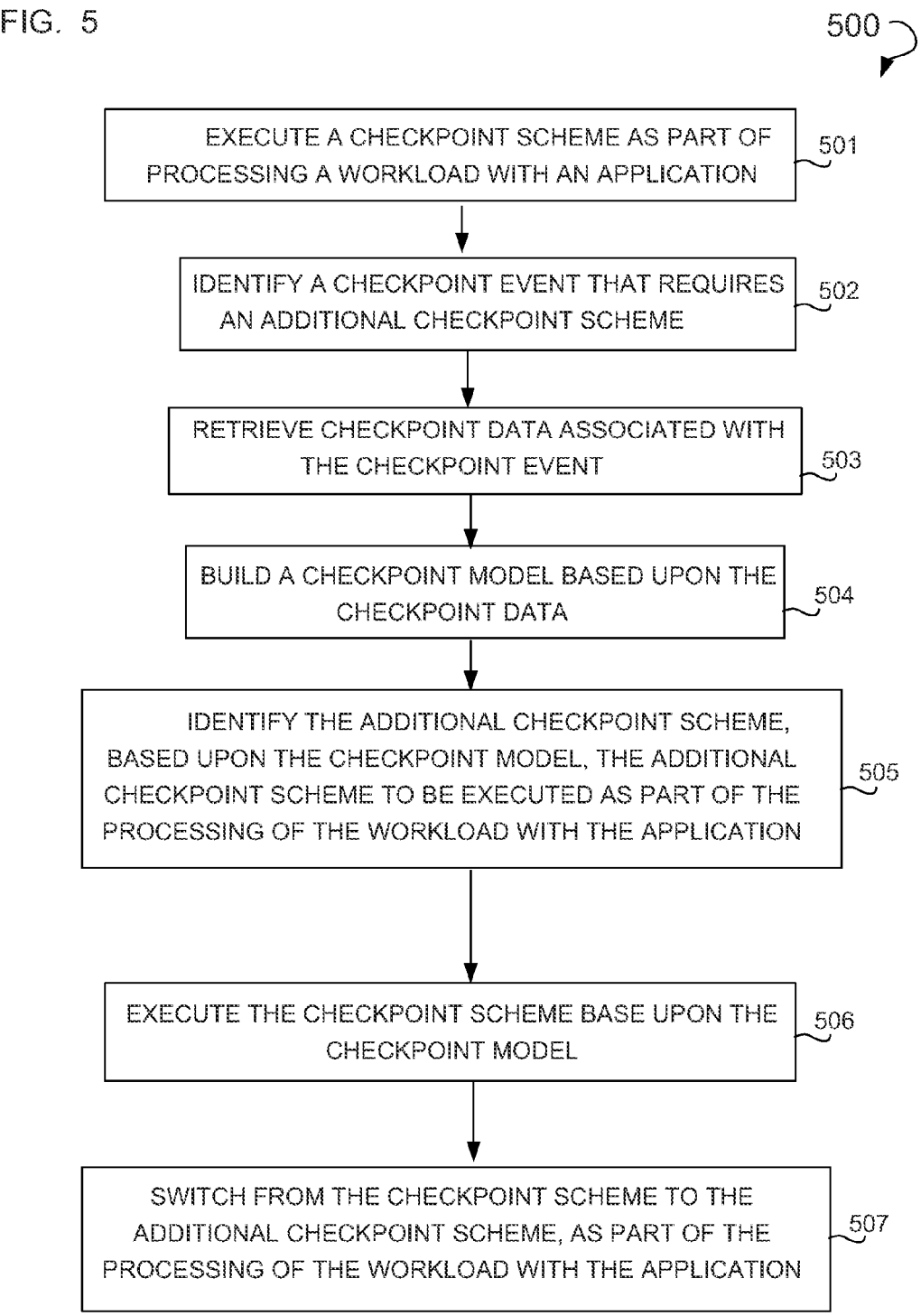

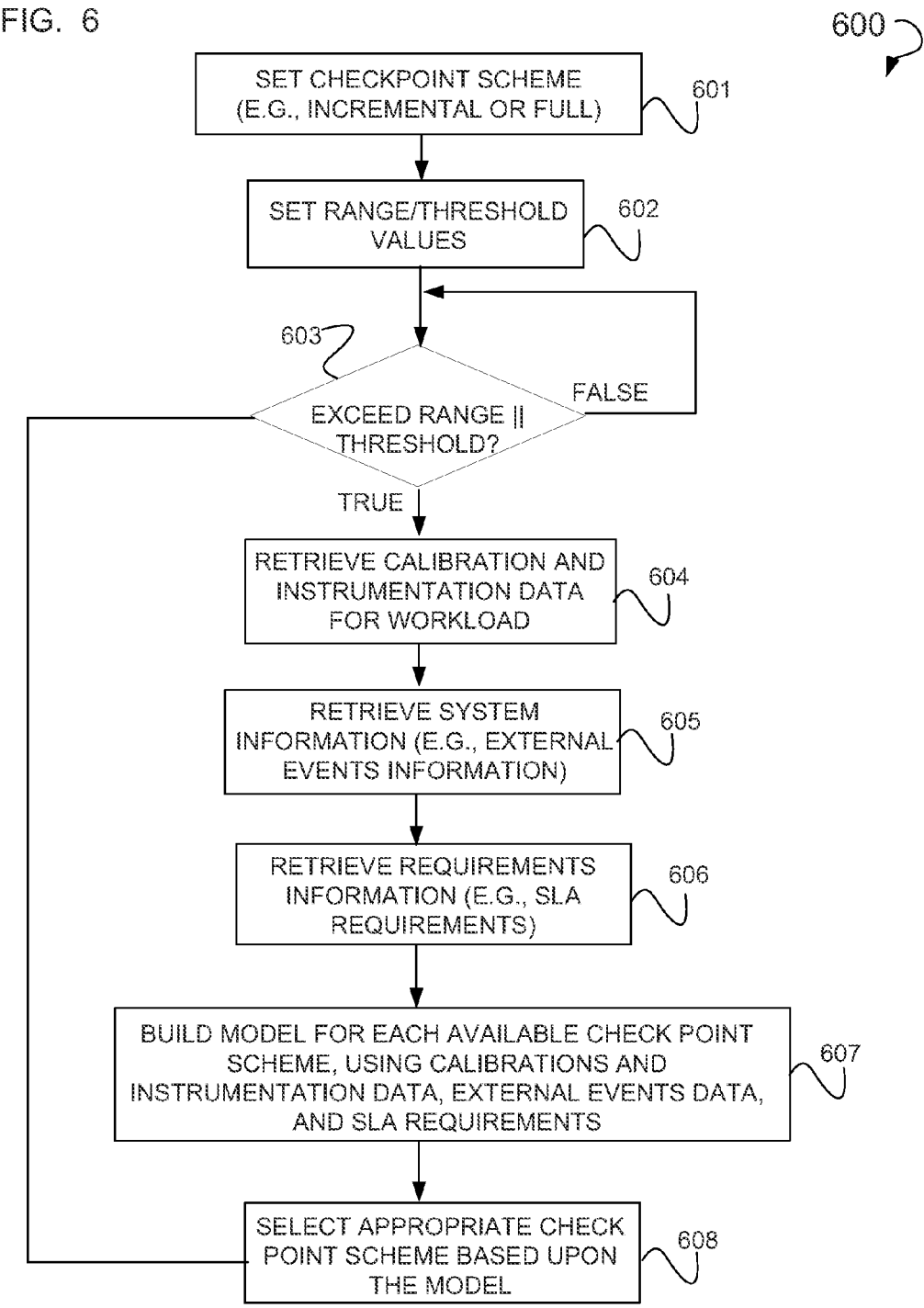

DYNAMICALLY MODELING AND SELECTING A CHECKPOINT SCHEME BASED UPON AN APPLICATION WORKLOAD

BACKGROUND

Checkpointing is a technique for inserting fault tolerance into computing systems. It includes, for example, storing a snapshot of a current application state, and using it for restarting the execution of an application in case of failure. The computing system that employs checkpointing may be virtualized such that a single computer system may have multiple operating systems, in the form of Virtual Machines (VMs), managed by a hypervisor (e.g., XEN), or other suitable virtual machine monitor. Software checkpointing schemes may be incremental stop (e.g., Copy On Write (COW), or Dirty Bit) or full stop.

In COW, all memory pages of each VM in the computer system are initially marked as read/only. The first modification of any page causes a hypervisor trap (i.e., an exception is thrown due to the attempted modification of the page). In servicing the trap, the hypervisor copies the original page into a ring buffer until the next checkpoint is declared. A checkpoint is declared either after a fixed time (e.g., 1 second), or if the ring buffer gets more than half full. Declaring a checkpoint pauses the VM just long enough to mark all pages r/o and start a new checkpoint ring (R2). The checkpoint can be saved (stable storage or remotely) by copying the new version of each page in previous ring (R1) (either from the VM if that page is still r/o or from R2).

Dirty Bit checkpointing is similar. All pages of the VM are initially marked clean. Any page modified will have the hardware dirty bit for that page. Declaring a checkpoint pauses the VM while all pages marked dirty are copied and then all pages marked clean again. The VM is executed with no overhead until the next checkpoint.

In full stop, the VM is paused and a full checkpoint is taken before execution of an application is continued. As compared to COW, there is no overhead (i.e., no COW overhead and no ring buffer of modified pages) before the checkpoint event. This said, there is, however, significant overhead at checkpoint time due to the taking of a full stop checkpoint.

BRIEF DESCRIPTION OF THE DRAWINGS

Some embodiments of the invention are described, by way of example, with respect to the following figures:

FIG. 3 is a block diagram of a system that includes a computer-readable media, according to an example embodiment, used for adaptive checkpointing.

FIG. 4 is a block diagram of a system, according to an example embodiment, used for adaptive checkpointing.

FIG. 5 is a flow chart illustrating an example method, according to an example embodiment, executed for adaptive checkpointing.

FIG. 6 is a flow chart illustrating the execution of a method, according to an example embodiment, for adaptive checkpointing that includes the use of a threshold or range based system for determining an appropriate checkpoint scheme.

DETAILED DESCRIPTION

Figure 1:
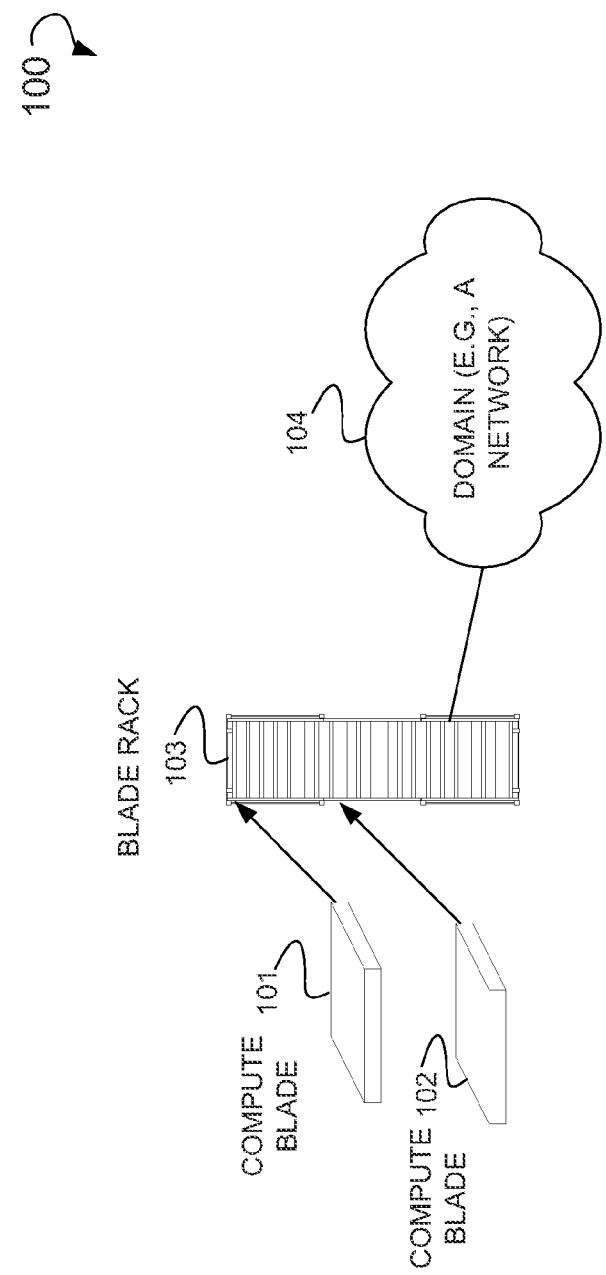
FIG. 1 is a diagram of a system, according to an example embodiment, for implementing adaptive checkpointing.

Illustrated is a system and method for adaptive checkpointing where the workload behavior of an application is examined, and the appropriate checkpoint scheme is dynamically selected. This adaptive checkpointing may be performed at the granularity of entire applications, or at the level of individual phases of the application. Further, as will be discussed in more detail below, different decisions could be taken based on different operating conditions of the computing system ("system") upon which the checkpoint scheme is being implemented. For example, when the system is lightly loaded, a more memory intensive scheme could be used, while if the system is heavily loaded, a more infrequent checkpointing scheme such as full stop checkpoint could be used.

In some example embodiments, adaptive checkpointing is used to select an incremental or full stop checkpointing scheme. The selection of the appropriate checkpointing scheme is based upon modeling each respective checkpoint scheme, and the selection of an appropriate scheme based upon the results of the modeling. During the modeling of each respective checkpointing scheme, certain considerations are taken into account by each model. These considerations include calibration and instrumentation, external events, and system and/or application requirements. The selection of an appropriate checkpoint scheme may include considering the relative costs of using each checkpoint scheme as reflected in the model of each. This adaptive checkpointing can occur on a periodic of event driven basis such that the adaptive checkpointing is implemented on an on-going basis by a hypervisor.

In some example embodiments, the system and method for adaptive checkpointing includes the use of a threshold or range based system for determining an appropriate checkpoint scheme. In this threshold or range based system, one or more thresholds are set for system. These thresholds are based upon the previously discussed considerations that include calibration and instrumentation, external events, and system and/or application requirements. For example, regarding calibration and instrumentation, the checkpointing scheme is modeled with certain assumptions regarding memory pages accessed, number of dirty pages, and/or the size of the VM image. Additionally, regarding external events, the checkpointing scheme may be modeled with certain assumptions regarding system load, or previous violations of utility functions. As to system and/or application requirements, the checkpointing scheme may be modeled based upon assumptions regarding the particular Service Level Agreement (SLA) to be enforced by the system. Further, the system and/or application requirements may take into account the runtime resource requirements of the application that is to be executed for which a checkpoint scheme is being modeled.

In one example implementation of this threshold or range based system for determining the appropriate checkpoint scheme, an incremental checkpoint scheme is implemented for a computer system. Further, a threshold value or value range is set for at least one of calibration and instrumentation, external events, and/or system and/or application requirements. If during the processing of a job, the load on the computer system is high, and the threshold value or value range exceeded, a switch may occur from the incremental stop checkpoint scheme to the full stop checkpoint scheme. Prior to making this switch, however, the full stop checkpoint scheme may be modeled using the current load information so as to determine whether the full stop checkpoint is appropriate. Further, in some example cases, prior to making the switch, the threshold value or value range may be allowed to be exceeded for a predetermined number of compute cycles so as to ensure that the high load on the computer system is not an anomaly. As will be discussed in more detail below, a similar implementation may be used to switch from a full stop checkpoint scheme to an incremental stop checkpoint scheme.

An alternative example embodiment of the system and method for adaptive checkpointing is also illustrated that uses a scoring system for determining the appropriate checkpoint scheme. In this scoring system, checkpoint schemes are assigned a score based upon the previously discussed considerations. From these scores a checkpoint scheme is assign a best model designation, and the checkpoint scheme having the best model designation is implemented on the computer system. This scoring system may be implemented prior to the processing of a job by the computer system, or during the processing of the job so as to allow for adaptive implementation of a checkpoint scheme. The details of this scoring system for determining the appropriate checkpoint scheme are outlined below.

FIG. 1 is a diagram of an example system 100 for implementing adaptive checkpointing. Shown are compute blades 101-102 upon which the adaptive checkpointing may be implemented. These compute blades 101-102 reside upon a blade rack 103. This blade rack 103 is operatively connected to a domain 104. The domain 104 may be a Local Area Network, (LAN), a Wide Area Network (WAN), internet, or other suitable network and associated topology.

Figure 2:
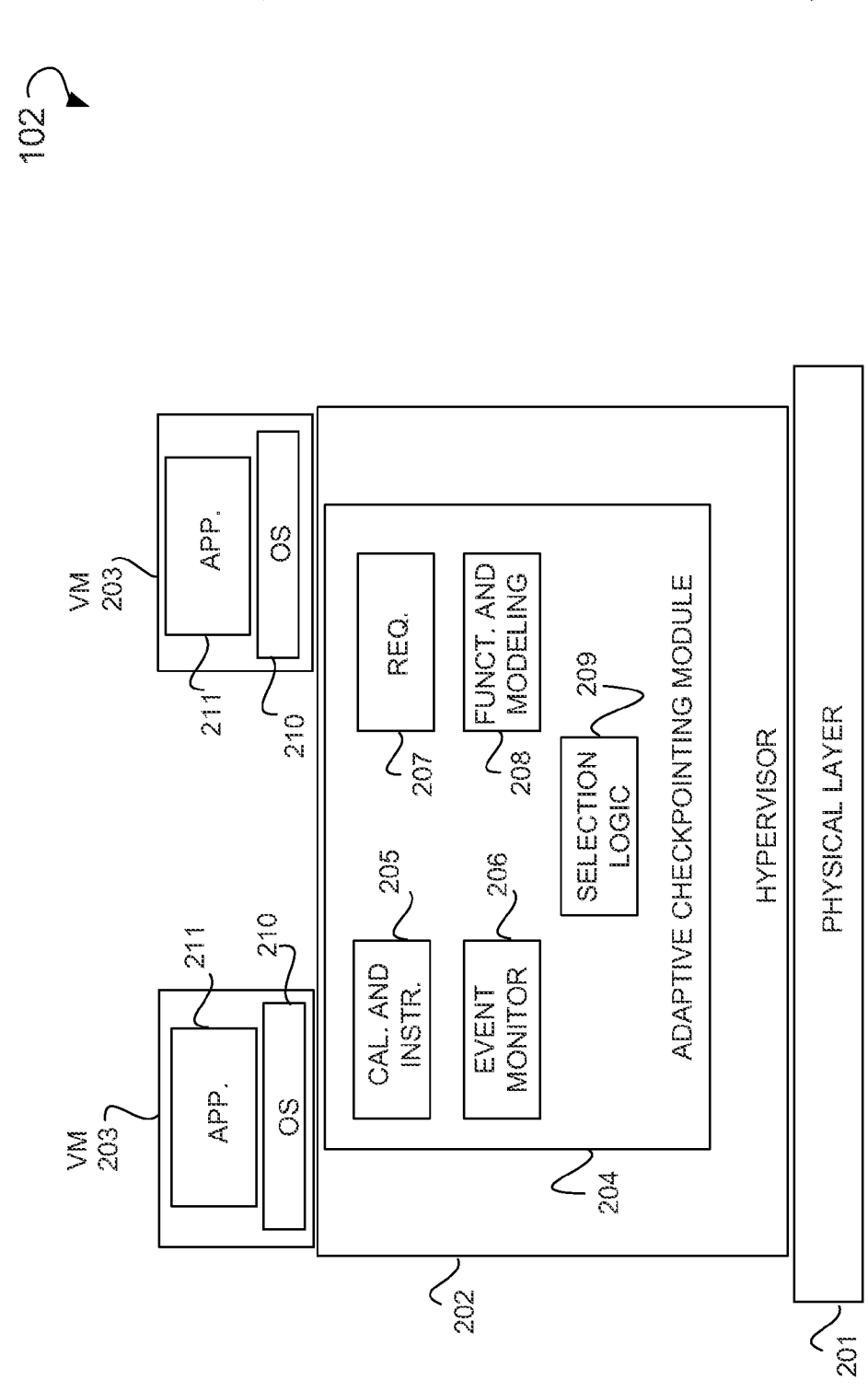
FIG. 2 is a diagram of a software and hardware stack, according to an example embodiment, associated with a compute blade.

FIG. 2 is a diagram of an example software and hardware stack associated with the compute blade 102. Shown are a physical layer 201, hypervisor layer 202, and a Virtual Machine (VM) layer 203. Residing within the hypervisor layer 202, is an adaptive checkpoint module 204. Included as part of this adaptive checkpoint module 204 is a calibration and instrumentation module 205, event monitor module 206, requirements module 207, function and modeling module 208, and a selection logic module 209. Included in the VM layer 203 is an application 211 that resides upon an Operating System (OS) 210. In some example cases, the application 211 provides the job that is processed by compute blade 102 (i.e., the computer system) for which adaptive checkpointing is performed.

Regarding the adaptive checkpointing module 204, this module may be used to implement a threshold or range based system for determining an appropriate checkpoint scheme. Additionally, the adaptive checkpointing module 204 may be used to implement a scoring system for determining the appropriate checkpoint scheme. The modules 205-209, included as part of the module 204, have functionality that relates to the previously discussed consideration. For example, the calibration and instrumentation module 205 collects application data (e.g., cycles to execute the application 211, and memory to be used by the application 211) and checkpoint overhead (i.e., the cost in terms of compute cycles). The event monitor module 206 monitors the current state of the compute blade 102 in terms of compute cycle usage, and memory usage. The requirements module 207 monitors and retrieves SLA requirement data regarding the system 100, and applications running on this system 100. For example, the SLA requirements data may dictate the allowable downtime for the system 100, and one or more of the compute blades 101-102. Additionally, the SLA requirements data may dictate how far back in the history of the execution of an application the checkpointing may occur. This is known herein as a checkpoint rollback. Moreover, the SLA requirements data may dictate when the checkpoint may occur (i.e., under what circumstances) and whether there is a preference for a particular type of checkpoint scheme (e.g., full stop versus incremental stop checkpointing). The function and modeling module 208 performs the modeling of the checkpoint schemes given the above referenced considerations and assumptions. During the course of the modeling engaged in by the function and modeling module 208, data from the modules 205-207 may be used as inputs in the form of assumptions in modeling the checkpoint scheme(s). The selection logic block 209 is used to select of an appropriate scheme based upon the results of the modeling. This selection logic may use the aforementioned threshold or range based system for determining an appropriate checkpoint scheme, or a scoring system for determining the appropriate checkpoint scheme. Further, the selection logic block 209 may rely upon the SLA requirements data in determining an appropriate checkpoint scheme. The execution of these various blocks may be triggered based upon a checkpoint event, and may be adaptive in nature.

FIG. 3 is a block diagram of an example system 300 used for adaptive checkpointing that includes a computer-readable media. These various blocks may be implemented in hardware, firmware, or software. The compute blade 102 is an example of the system 300. Further, these various blocks are operatively connected in terms of being logically or physically connected. Shown is a CPU 301 operatively connected to a memory 302. The memory 302 may include logic encoded in one or more tangible media to execute a checkpoint scheme as part of processing a workload with an application. Further, the logic may be executed to identify a checkpoint event that requires an additional checkpoint scheme. Additionally, the logic may be executed to retrieve checkpoint data associated with the checkpoint event. The logic may also be executed to build a checkpoint model based upon the checkpoint data. Further, the logic may be executed to identify the additional checkpoint scheme, based upon the checkpoint model, the additional checkpoint scheme to be executed as part of the processing of the workload with the application. In some example embodiments, the checkpoint event includes an exceeding of a range value, or threshold value. Moreover, in some example embodiments, the checkpoint event includes a failure to meet a range value or threshold value. The value includes at least one of a memory page modification rate, a CPU cycle rate, a memory usage rate, or a power usage rate. Additionally, the checkpoint scheme includes at least one of a full stop checkpoint, or an incremental stop checkpoint. The logic may be executed to build of the checkpoint model the logic executed to retrieve calibration and instrumentation data, retrieve system information, and retrieve requirements information. The logic may be executed to switch from the checkpoint scheme to the additional checkpoint scheme, as part of the processing of the workload using the application.

FIG. 4 is a block diagram of an example system 400 used for adaptive checkpointing. These various blocks may be implemented in hardware, firmware, or software, The compute blade 102 is an example of the system 400. Further, these various blocks are operatively connected in terms of being logically or physically connected. Shown is a CPU 401 operatively connected to a memory 402. Operatively connected to the CPU 401 is a checkpoint module 403 to execute a checkpoint scheme as part of processing a workload with an application. Operatively connected to the CPU 401 is an adaptive checkpointing module 404 to identify a checkpoint event that requires an additional checkpoint scheme. Operatively connected to the CPU 401 is an event monitor module 405 to retrieve checkpoint data associated with the checkpoint event. Operatively connected to the CPU 401 is a function and modeling module 406 to build a checkpoint model based upon the checkpoint data. Operatively connected to the CPU 401 is a selection logic module 407 to identify the additional checkpoint scheme, based upon the checkpoint model, the additional checkpoint scheme to be executed as part of the processing of the workload with the application. Operatively connected to the CPU 401 is a requirements module 408 to monitor and retrieve SLA requirement data regarding the apparatus. Operatively connected to the CPU 401 is a calibration and instrumentation module 409 to collect data associated with an execution of the application. In some example embodiments, the checkpoint model includes at least one of a full stop checkpoint model, or an incremental stop checkpoint model.

FIG. 5 is a flow chart illustrating an example method 500 executed for adaptive checkpointing. This method 500 may be executed by the compute blade 102. Operation 501 executes a checkpoint scheme as part of processing a workload with an application. Operation 502 is executed to identify a checkpoint event that requires an additional checkpoint scheme.

Operation 503 is executed to retrieve checkpoint data associated with the checkpoint event. Operation 504 is executed to build a checkpoint model based upon the checkpoint data. Operation 505 is executed to identify the additional checkpoint scheme, based upon the checkpoint model, the additional checkpoint scheme to be executed as part of the processing of the workload with the application. In some example embodiments, the checkpoint event includes an exceeding of a range value, or a threshold value. In some example embodiments, the checkpoint event includes failing to meet a range value or threshold value. In some example embodiments, the value includes at least one of a memory page modification rate, a system load value, a CPU cycle rate, a memory usage rate, or a power usage rate. Operation 506 executes the checkpoint scheme base upon the checkpoint model. In some example embodiments, the checkpoint scheme includes at least one of a full stop checkpoint, or an incremental stop checkpoint. In some example embodiments, the building of the checkpoint model includes retrieving calibration and instrumentation data, retrieving system information, and retrieving requirements information. In some example embodiments, the requirements information includes SLA data. Operation 507 is executed to switch from the checkpoint scheme to the additional checkpoint scheme, as part of the processing of the workload with the application.

FIG. 6 is a flow chart illustrating the example execution of a method 600 for adaptive checkpointing that includes the use of a threshold or range based system for determining an appropriate checkpoint scheme. This method 600 may be executed as part of the adaptive checkpointing module 204. Shown is an operation 601 that is executed to set a checkpoint scheme (e.g., a full stop or incremental stop checkpoint scheme) for the system 100. This checkpoint scheme may be dictated by SLA requirement data. Operation 602 is executed to set a range or threshold value(s) for the system 100. These range or threshold value(s) may be set for memory pages accessed, the number of dirty pages, CPU cycles used, memory used, power consumption, or the load placed on the system 100 during the processing of a job. The threshold or range may be dictated by the SLA requirement data. Decision operation 603 is executed to determine whether the threshold or range (i.e., a checkpoint event) has been exceeded. In some cases, the decision operation 603 may be executed to determine whether the threshold or range (i.e., a checkpoint event) has failed to be met. In cases where the decision operation 603 evaluates to "false," the decision operation 603 is re-executed. In cases where decision operation 603 evaluates to "true," an operation 604 is executed. Further, the decision operation 603 may rely, in part, upon the SLA requirements data in determining an appropriate checkpoint scheme. Operation 604 is executed to retrieve instrumentation and calibration data for a workload. This data may be retrieved using the module 205. Operation 605 is executed to retrieve system information for the system 100. This operation 605 may be executed using the event monitor module 206. Operation 606 is executed to retrieve SLA requirement data, and is executed by the requirements module 207. Operation 607 is executed to build a model for each available checkpoint scheme using the function and modeling module 208. Operation 608 is executed to select the appropriate checkpoint scheme based upon the model built using operation 607. Decision operation 603 may be re-executed after the execution of operation 608. This operation 608 may be executed using the selection logic module 209.

Figure 7:
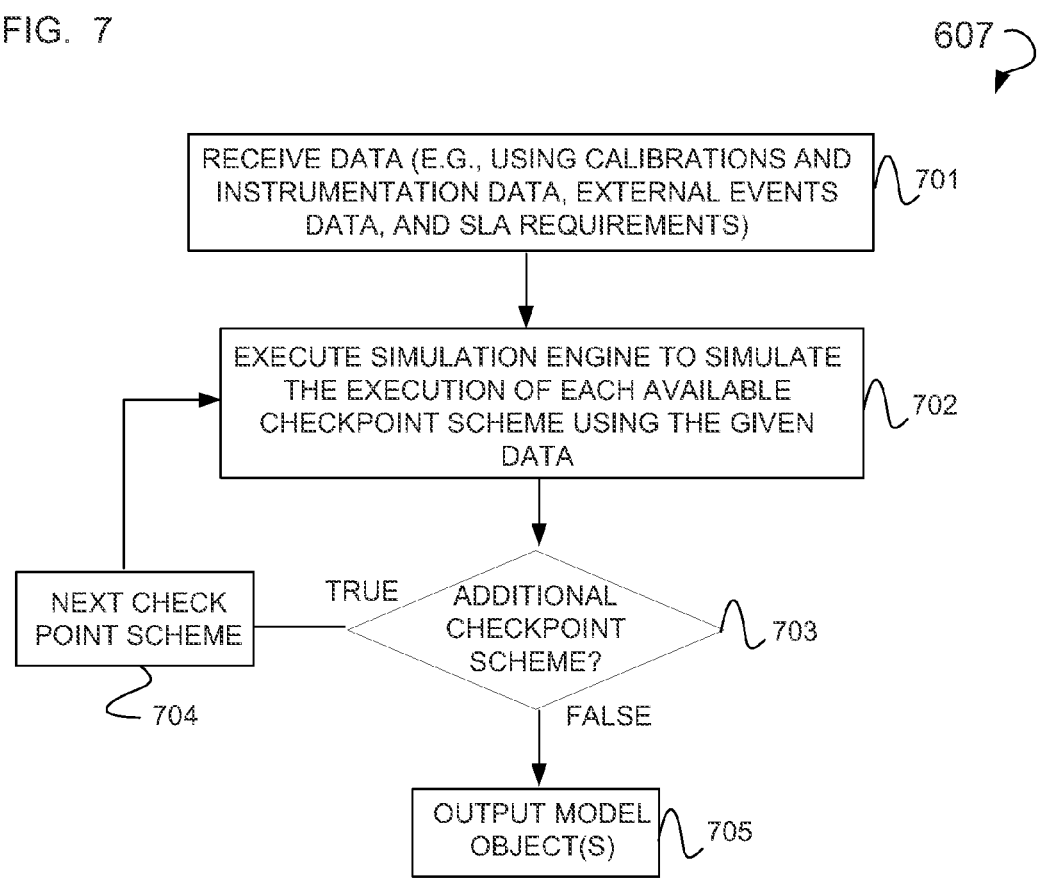
FIG. 7 is a flow chart illustrating the execution of an operation, according to an example embodiment, to build a model for each available checkpoint scheme.

FIG. 7 is a flow chart illustrating the execution of the operation 607 to build a model for each available checkpoint scheme. Shown is an operation 701 that is executed to receive data. This data may be the instrumentation and calibration data, external events data, or SLA requirements data. Operation 702 may be executed to execute a simulation engine to simulate the execution of each available checkpoint scheme using the data from the execution of operation 701. Decision operation 703 is executed to determine whether an additional checkpoint schemes need to be simulated. In cases where decision operation 703 evaluates to "false," an operation an operation 705 is executed. In cases where a decision operation 703 evaluates to "true," an operation 704 is executed. Operation 704 is executed to retrieve the next checkpoint scheme for which a simulation needs to occur. Operation 705 is executed to generate an output model object.

Figure 8:
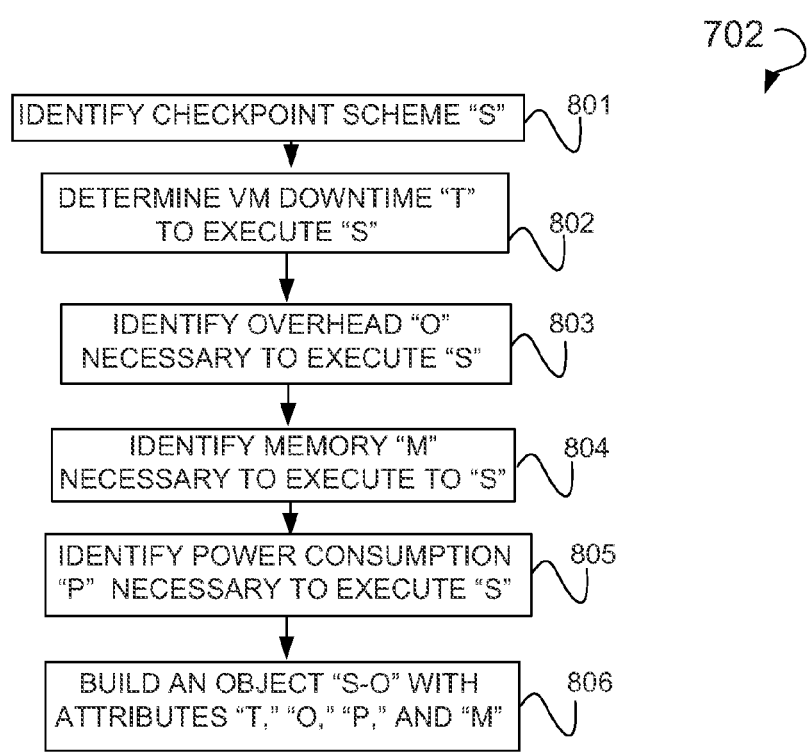
FIG. 8 is a flow chart illustrating the execution of an operation, according to an example embodiment, that executes a simulation engine to simulate the execution of each available checkpoint scheme.

FIG. 8 is a flow chart illustrating the execution of operation 702 that executes a simulation engine to simulate the execution of each available checkpoint scheme. Operation 801 is executed to identify a checkpoint scheme "S." Identify, as used herein, includes to get or retrieve. Operation 802 is executed to determine VM downtime, where "S" is executed. Operation 803 is executed to overhead "O," necessary to executed "S." Operation 804 is executed to identify memory "M," necessary to execute "S." Operation 805 is executed to identify power consumption "P," necessary to execute "S." Operation 806 is executed to build object "S-O," with attributes "T," "O," "P," and "M."

Figure 9:
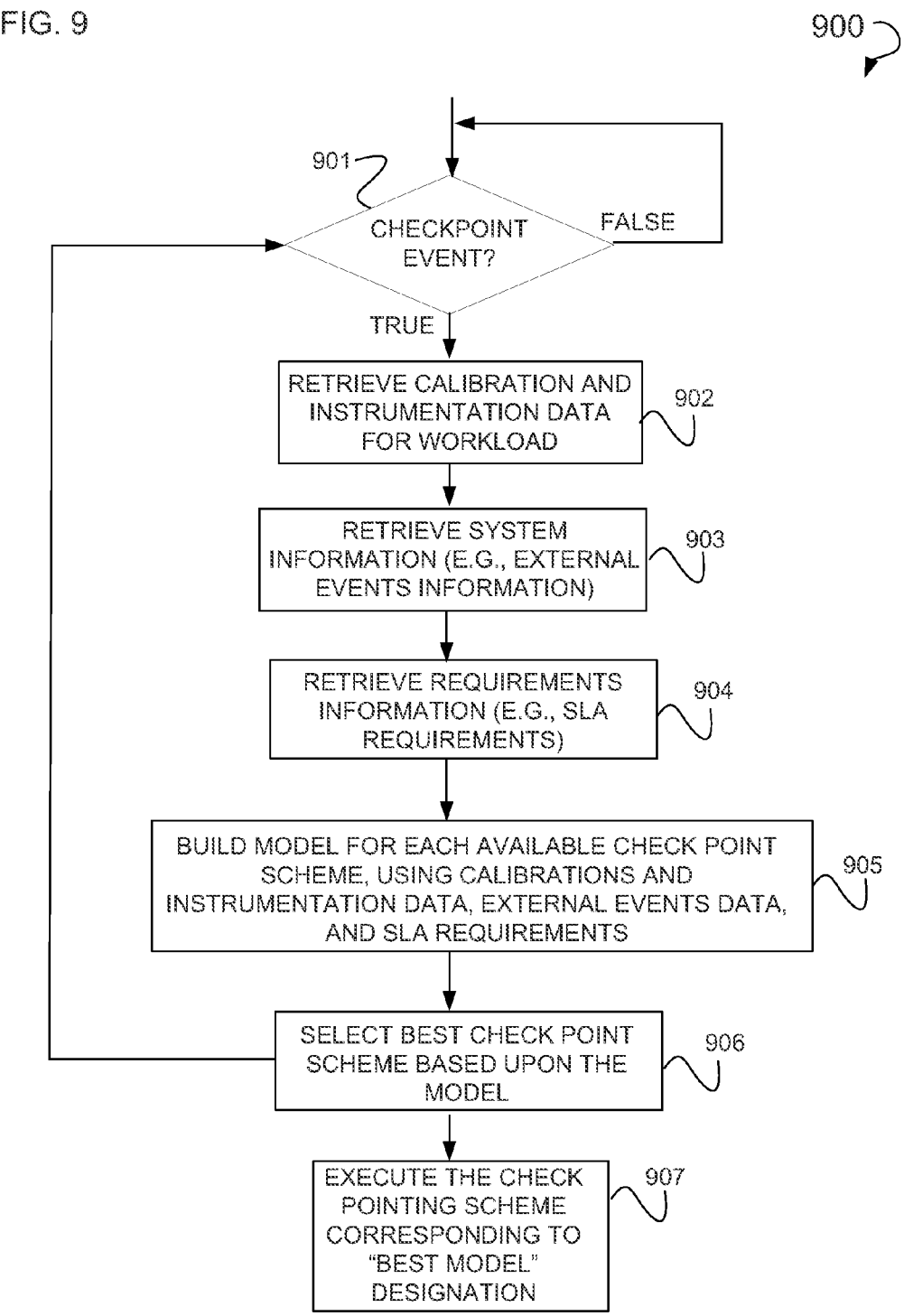
FIG. 9 is a flow chart illustrating the execution of a method, according to an example embodiment, to implement a scoring system for determining the appropriate checkpoint scheme.

FIG. 9 is a flow chart illustrating the execution of example method 900 to implement a scoring system for determining the appropriate checkpoint scheme. This method 900 may be executed as part of the adaptive checkpointing module 204. Shown is a decision operation 901 that is executed to determine whether a checkpoint event has occurred. This checkpoint event may be the expiration of a period of time, the exceeding of a memory allocation for a compute blade, a hard failure/fault or soft failure/fault, an exceeding of a predefined number of CPU cycles, the exceeding of a page modification rate. Additionally, the decision operation 901 may rely, in part, upon the SLA requirement data in determining whether a checkpoint event has occurred. Operations 902-905 are akin to operations 904-907 respectively. Operation 906 is executed to select the best checkpoint scheme based upon the model. Operation 907 is executed to execute the checkpoint scheme corresponding to a "best model" designation.

Figure 10:
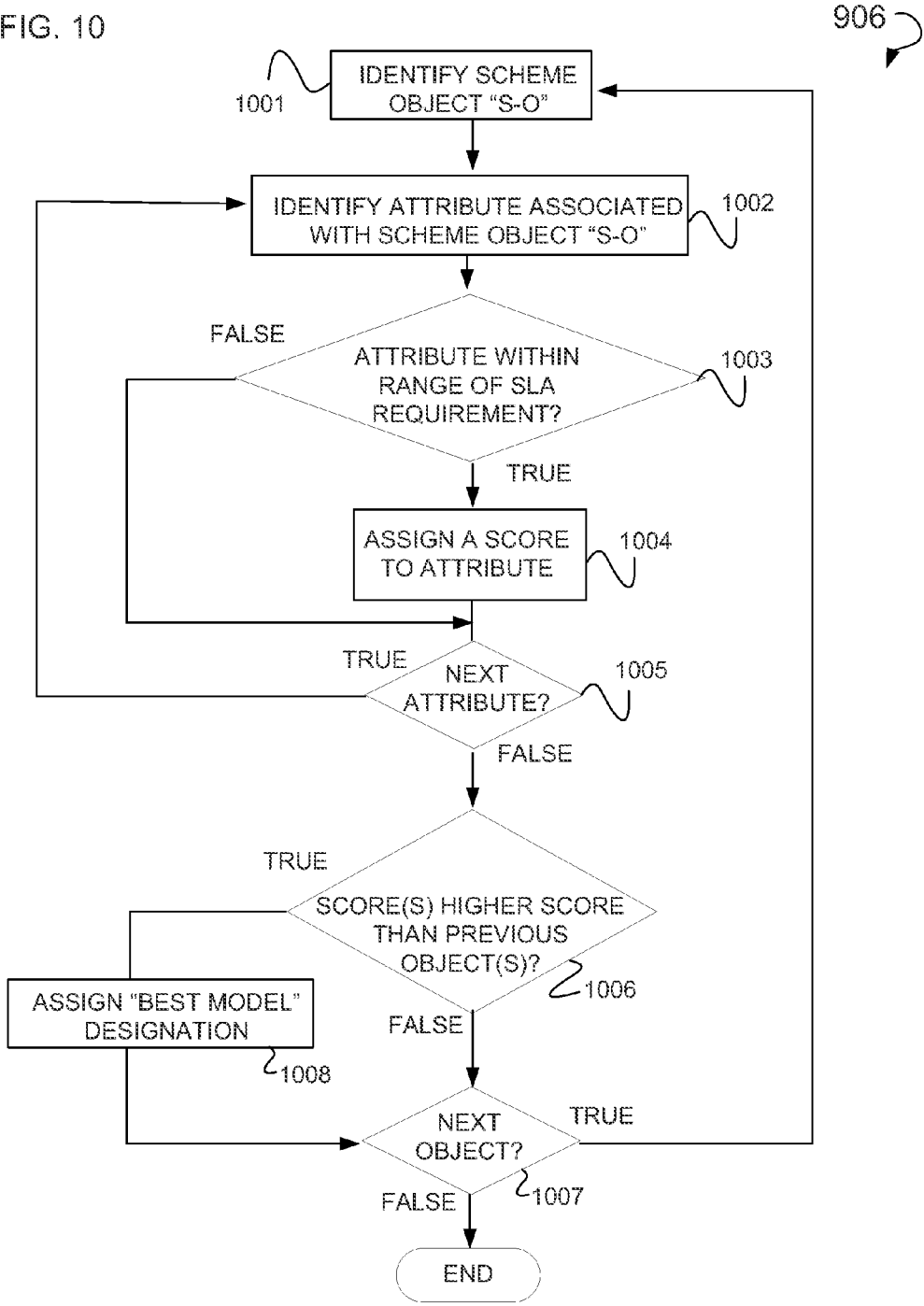
FIG. 10 is a flow chart illustrating the execution of a method, according to an example embodiment, to select the best checkpoint scheme based upon a model.

FIG. 10 is a flow chart illustrating the example execution of a method 906 to select the best checkpoint scheme based upon a model. Shown is an operation 1001 that is executed to identify a checkpoint scheme object "S-O." Operation 1002 is executed to identify an attribute(s) associated with checkpoint scheme object "S-O." Decision operation 1003 is executed to determine whether the attribute is within the range of requirements dictated by the SLA requirements data. In cases where decision operation 1003 evaluates to "false," decision operation 1005 is executed. In cases where decision operation 1003 evaluates to "true," an operation 1004 is executed. Operation 1004 is executed to assign a score to an attribute identified at operation 1002. The score may be a numeric value, a character designation denoting a rating of an attribute, or some other suitable way to distinguish an attribute of a checkpoint object based upon whether it is within the range of requirements dictated by an SLA requirements data. Decision operation 1005 is executed to determine whether there is a next attribute. In cases where decision operation 1005 evaluates to "true," the operation 1002 is re-executed. In cases where decision operation 1002 evaluates to "false," a decision operation 1006 is executed. Decision operation 1006 is executed to determine whether the attribute score of the current object (i.e., "S-O") is higher than the previous object. In cases where decision operation 1006 evaluates to "false," decision operation 1007 is executed. In cases where decision operation 1006 evaluates to "true," operation 1008 is executed. Decision operation 1007 is executed to determine whether a next object (i.e., another checkpoint scheme) exists. In cases where decision operation 1007 evaluates to "true," operation 1001 is re-executed. In cases where decision operation 1007 evaluates to "false," a termination condition is executed.

Figure 11:
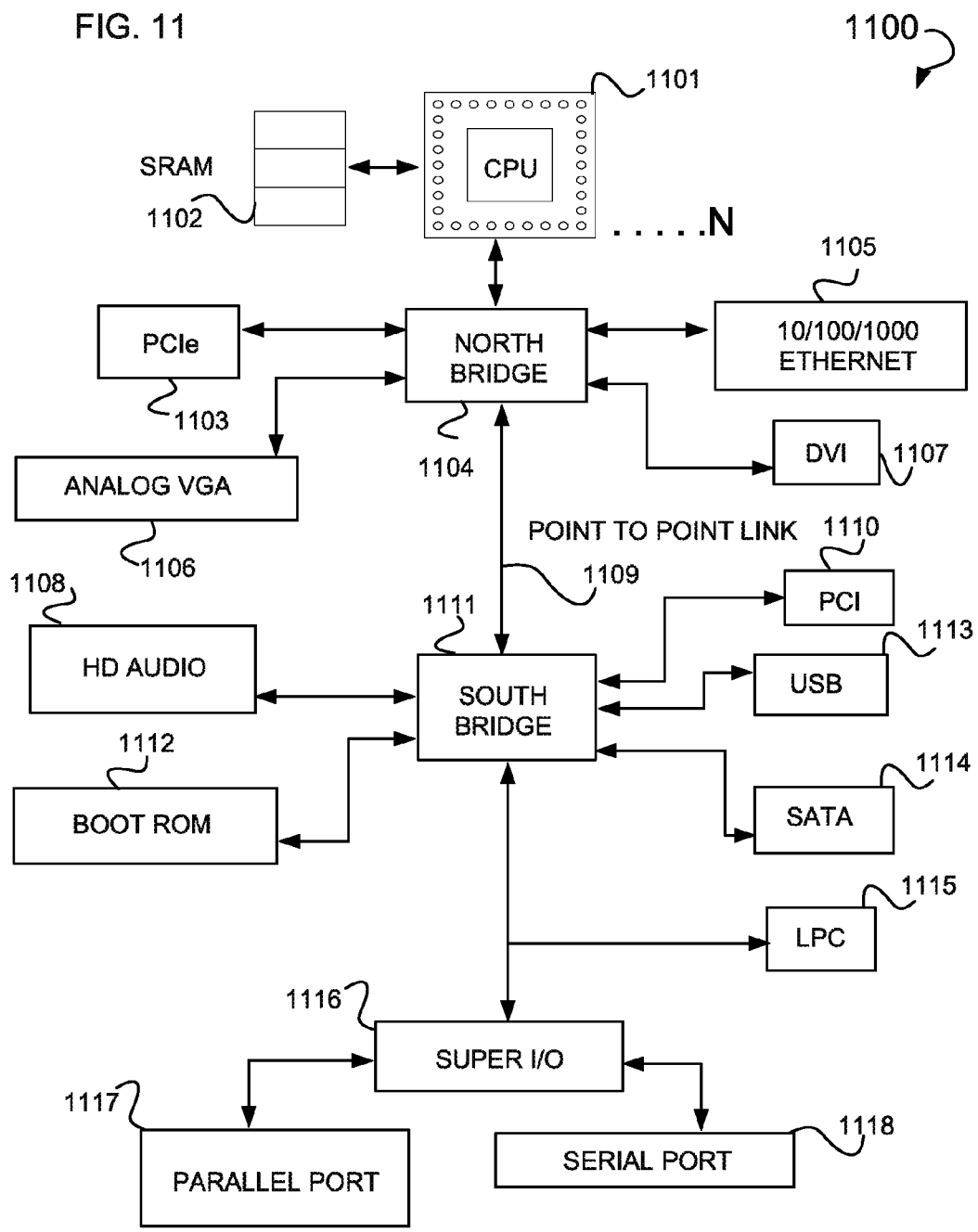
FIG. 11 is a diagram of an example computer system.

FIG. 11 is a diagram of an example computer system 1100. Shown is a CPU 1101. The processor die 201 may be a CPU 1101. In some example embodiments, a plurality of CPU may be implemented on the computer system 1100 in the form of a plurality of core (e.g., a multi-core computer system), or in some other suitable configuration. Some example CPUs include the x86 series CPU. Operatively connected to the CPU 1101 is Static Random Access Memory (SRAM) 1102. Operatively connected includes a physical or logical connection such as, for example, a point to point connection, an optical connection, a bus connection or some other suitable connection. A North Bridge 1104 is shown, also known as a Memory Controller Hub (MCH), or an Integrated Memory Controller (IMC), that handles communication between the CPU and PCIe, Dynamic Random Access Memory (DRAM), and the South Bridge. An ethernet port 1105 is shown that is operatively connected to the North Bridge 1104. A Digital Visual Interface (DVI) port 1107 is shown that is operatively connected to the North Bridge 1104. Additionally, an analog Video Graphics Array (VGA) port 1106 is shown that is operatively connected to the North Bridge 1104. Connecting the North Bridge 1104 and the South Bridge 1111 is a point to point link 1109. In some example embodiments, the point to point link 1109 is replaced with one of the above referenced physical or logical connections. A South Bridge 1111, also known as an I/O Controller Hub (ICH) or a Platform Controller Hub (PCH), is also illustrated. A PCIe port 1103 is shown that provides a computer expansion port for connection to graphics cards and associated GPUs. Operatively connected to the South Bridge 1111 are a High Definition (HD) audio port 1108, boot RAM port 1112, PCI port 1110, Universal Serial Bus (USB) port 1113, a port for a Serial Advanced Technology Attachment (SATA) 1114, and a port for a Low Pin Count (LPC) bus 1115. Operatively connected to the South Bridge 1111 is a Super Input/Output (I/O) controller 1116 to provide an interface for low-bandwidth devices (e.g., keyboard, mouse, serial ports, parallel ports, disk controllers). Operatively connected to the Super I/O controller 1116 is a parallel port 1117, and a serial port 1118.

The SATA port 1114 may interface with a persistent storage medium (e.g., an optical storage devices, or magnetic storage device) that includes a machine-readable medium on which is stored one or more sets of instructions and data structures (e.g., software) embodying or utilized by any one or more of the methodologies or functions illustrated herein. The software may also reside, completely or at least partially, within the SRAM 1102 and/or within the CPU 1101 during execution thereof by the computer system 1100. The instructions may further be transmitted or received over the 10/100/1000 ethernet port 1105, USB port 1113 or some other suitable port illustrated herein.

In some example embodiments, a removable physical storage medium is shown to be a single medium, and the term "machine-readable medium" should be taken to include a single medium or multiple medium (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any of the one or more of the methodologies illustrated herein. The term "machine-readable medium" shall accordingly be taken to include, but not be limited to, solid-state memories, optical and magnetic medium, and carrier wave signals.

In some example embodiments, the methods illustrated herein are implemented as one or more computer-readable or computer-usable storage media or mediums. The storage media include different forms of memory including semiconductor memory devices such as DRAM, or SRAM, Erasable and Programmable Read-Only Memories (EPROMs), Electrically Erasable and Programmable Read-Only Memories (EEPROMs) and flash memories; magnetic disks such as fixed, floppy and removable disks; other magnetic media including tape; and optical media such as Compact Disks (CDs) or Digital Versatile Disks (DVDs). Note that the instructions of the software discussed above can be provided on one computer-readable or computer-usable storage medium, or alternatively, can be provided on multiple computer-readable or computer-usable storage media distributed in a large system having possibly plural nodes. Such computer-readable or computer-usable storage medium or media is (are) considered to be part of an article (or article of manufacture). An article or article of manufacture can refer to any manufactured single component or multiple components.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the "true" spirit and scope of the invention.

What is claimed is:

1. A computer implemented method comprising:
   executing a first checkpoint scheme as part of processing a workload with an application;
   monitoring during the processing, for a checkpoint event that necessitates an additional checkpoint scheme;
   retrieving checkpoint data associated with the checkpoint event;
   adaptively building a checkpoint model of a plurality of checkpoint schemes based upon the checkpoint data; and
   dynamically selecting the additional checkpoint scheme from the plurality of checkpoint schemes, based upon the checkpoint model, the additional checkpoint scheme to be executed as part of the processing of the workload with the application.

2. The computer implemented method of claim 1, wherein the checkpoint event includes an exceeding of a range value, or a threshold value.

3. The computer implemented method of claim 1, wherein the checkpoint event includes failing to meet a range value or threshold value.

4. The computer implemented method of claim 2, wherein the value includes at least one of a memory page modification rate, a system load value, a CPU cycle rate, a memory usage rate, or a power usage rate.

5. The computer implemented method of claim 1, further comprising executing the checkpoint scheme based upon the checkpoint model.

6. The computer implemented method of claim 5, wherein the plurality of checkpoint schemes includes at least one of a full stop checkpoint, or an incremental stop checkpoint.

7. The computer implemented model of claim 1, wherein the building of the checkpoint model includes:
   retrieving calibration and instrumentation data;
   retrieving system information; and
   retrieving requirements information.

8. The computer implemented method of claim 7, wherein the requirements information includes Service Level Agreement (SLA) data.

9. The computer implemented method of claim 1, further comprising switching from the checkpoint scheme to the additional checkpoint scheme, as part of the processing of the workload with the application.

10. A compute blade system comprising:
    at least one hardware processor;
    a memory coupled to the processor, the memory including instructions that upon execution cause the processor to:
    execute a first checkpoint scheme as part of processing a workload with an application;
    monitor during the processing, for a checkpoint event that necessitates an additional checkpoint scheme;
    retrieve checkpoint data associated with the checkpoint event;
    adaptively build a checkpoint model of a plurality of checkpoint schemes based upon the checkpoint data; and
    dynamically select the additional checkpoint scheme from the plurality of checkpoint schemes, based upon the checkpoint model, the additional checkpoint scheme to be executed as part of the processing of the workload with the application.

11. The computer system of claim 10, wherein the checkpoint event includes an exceeding of a range value, or threshold value.

12. The computer system of claim 10, wherein the checkpoint event includes a failure to meet a range value or threshold value.

13. The computer system of claim 11, wherein the value includes at least one of a memory page modification rate, a CPU cycle rate, a memory usage rate, or a power usage rate.

14. The computer system of claim 10, wherein the plurality of checkpoint schemes includes at least one of a full stop checkpoint, or an incremental stop checkpoint.

15. The computer system of claim 10, wherein the building of the checkpoint model includes logic encoded in one or more tangible media for execution and when executed operable to:
    retrieve calibration and instrumentation data;
    retrieve system information; and
    retrieve requirements information.

16. The computer system of claim 10, wherein the memory further comprises instructions that when executed cause the processor to switch from the checkpoint scheme to the additional checkpoint scheme, as part of the processing of the workload using the application.

17. A compute blade apparatus comprising:
    at least one hardware processor;
    a checkpoint module to execute a first checkpoint scheme as part of processing a workload with an application;
    an adaptive checkpointing module to monitor during the processing, for a checkpoint event that necessitates an additional checkpoint scheme;
    an event monitor module to retrieve checkpoint data associated with the checkpoint event;
    a function and modeling module to adaptively build a checkpoint model of a plurality of checkpoint schemes based upon the checkpoint data; and
    a selection logic module to dynamically select the additional checkpoint scheme from the plurality of checkpoint schemes, based upon the checkpoint model, the additional checkpoint scheme to be executed as part of the processing of the workload with the application.

18. The compute blade apparatus of claim 17, further comprising a requirements module to monitor and retrieve Service Level Agreement (SLA) requirement data regarding the apparatus.

19. The compute blade apparatus of claim 17, further comprising a calibration and instrumentation module to collect data associated with an execution of the application.

20. The compute blade apparatus of claim 17, wherein the checkpoint model includes at least one of a full stop checkpoint model, or an incremental stop checkpoint model.

* * * * *